US011297697B1

United States Patent
Xiong et al.

(10) Patent No.: US 11,297,697 B1
(45) Date of Patent: *Apr. 5, 2022

(54) LIGHT MODULATING CONTROL METHOD FOR DIMMING ANALOG CONSTANT CURRENT LED DRIVER

(71) Applicant: Universal Lighting Technologies, Inc., Madison, AL (US)

(72) Inventors: Wei Xiong, Madison, AL (US); Travis L. Berry, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 929 days.

This patent is subject to a terminal disclaimer.

(21) Appl. No.: 16/040,750

(22) Filed: Jul. 20, 2018

Related U.S. Application Data (60) Provisional application No. 62/538,008, filed on Jul. 28, 2017.

(51) Int. Cl.
*H05B 45/14* (2020.01)
*H05B 45/355* (2020.01)
*H05B 45/3725* (2020.01)

(52) U.S. Cl.
CPC .......... *H05B 45/14* (2020.01); *H05B 45/355* (2020.01); *H05B 45/3725* (2020.01)

(58) Field of Classification Search
CPC .................... H05B 45/14; H05B 45/32–347
See application file for complete search history.

(56) References Cited

U.S. PATENT DOCUMENTS

| 5,696,431 | A | 12/1997 | Giannopoulos et al. |
| 7,843,141 | B1 | 11/2010 | Xiong et al. |
| 9,112,415 | B2 | 8/2015 | Grakist et al. |
| 9,237,613 | B1 | 1/2016 | Xiong et al. |
| 2008/0224636 | A1* | 9/2008 | Melanson ............ H05B 45/38 315/307 |
| 2010/0149838 | A1 | 6/2010 | Musi et al. |
| 2012/0026759 | A1 | 2/2012 | Balakrishnan et al. |
| 2013/0271021 | A1 | 10/2013 | Elferich |
| 2013/0300310 | A1 | 11/2013 | Hu |
| 2014/0091720 | A1 | 4/2014 | Brinlee |

(Continued)

FOREIGN PATENT DOCUMENTS

WO   WO-2010027254 A1 *  3/2010 ............ H05B 45/48

*Primary Examiner* — Abdullah A Riyami
*Assistant Examiner* — Syed M Kaiser
(74) *Attorney, Agent, or Firm* — Patterson Intellectual Property Law, P.C.

(57) ABSTRACT

An LED driver for light modulation control includes a power converter circuit, a feedback circuit, a buffer circuit, an energy recovery circuit, and a controller. The power converter circuit is configured to provide an output current to an LED load coupled thereto. The feedback circuit is configured to generate an error signal which is fed back to the power converter circuit for maintaining the power converter circuit in a constant current output state. The buffer circuit is coupled to the LED load and configured for quick turn off of the LED load and for temporary storage of power. The energy recovery circuit is configured to reuse the power stored in the buffer circuit before relying on an external power source to power the controller and the feedback circuit. The controller is configured to control at least one aspect of each of the circuits of the LED driver.

17 Claims, 8 Drawing Sheets

(56) References Cited

U.S. PATENT DOCUMENTS

| | | |
|---|---|---|
| 2014/0152187 A1 | 6/2014 | Lin et al. |
| 2014/0239840 A1* | 8/2014 | Wang .................... H05B 45/10 |
| | | 315/224 |
| 2014/0346874 A1 | 11/2014 | Fang et al. |
| 2015/0042227 A1 | 2/2015 | Kumar et al. |
| 2015/0257222 A1 | 9/2015 | Siessegger et al. |
| 2016/0014858 A1 | 1/2016 | Ramabhadran et al. |
| 2016/0044753 A1* | 2/2016 | Lee ........................ H03K 7/08 |
| | | 315/185 R |
| 2016/0073457 A1 | 3/2016 | Nakajo |
| 2016/0190945 A1 | 6/2016 | Liu et al. |
| 2018/0317292 A1* | 11/2018 | Katsura ................. H05B 45/38 |
| 2019/0032864 A1* | 1/2019 | Xiong .................... F21K 9/272 |
| 2020/0271279 A1* | 8/2020 | Xiong .................... F21V 3/061 |

* cited by examiner

LIGHT MODULATING CONTROL METHOD FOR DIMMING ANALOG CONSTANT CURRENT LED DRIVER

CROSS-REFERENCES TO RELATED APPLICATIONS

This application claims benefit of U.S. Provisional Patent Application No. 62/538,008 filed Jul. 28, 2017, entitled "Light Modulated Control Method for Dimming Analog Constant Current LED Driver," and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present invention relates generally to dimming power supplies such as LED drivers for lighting systems. More particularly, the present invention relates to fast and lossless output current modulation of constant current LED drivers.

BACKGROUND

Modulation of the lighting output from light emitting diodes (LEDs) can be used for wireless communication with external devices, for example to communicate the status of components in a lighting device, for device commissioning, etc. However, it is difficult to modulate the output of a constant output current type LED driver, which is the most popular type of LED driver currently used in the market. Generally speaking, there are two types of constant current dimmable LED drivers in the market: pulse width modulation (PWM) output and analog constant output. The analog constant output type of LED driver has a much better flickering index as compared with the PWM output type, at least because the analog output type driver always has constant DC current.

Constant current control typically requires at least two signals to maintain a certain current level, a sensed output current (feedback) signal and a reference signal. The output current signal is compared with the reference signal and fed back into the driver for control adjustments (e.g., to switching frequency or duty ratio) in order to maintain the certain current level.

Figure 1:
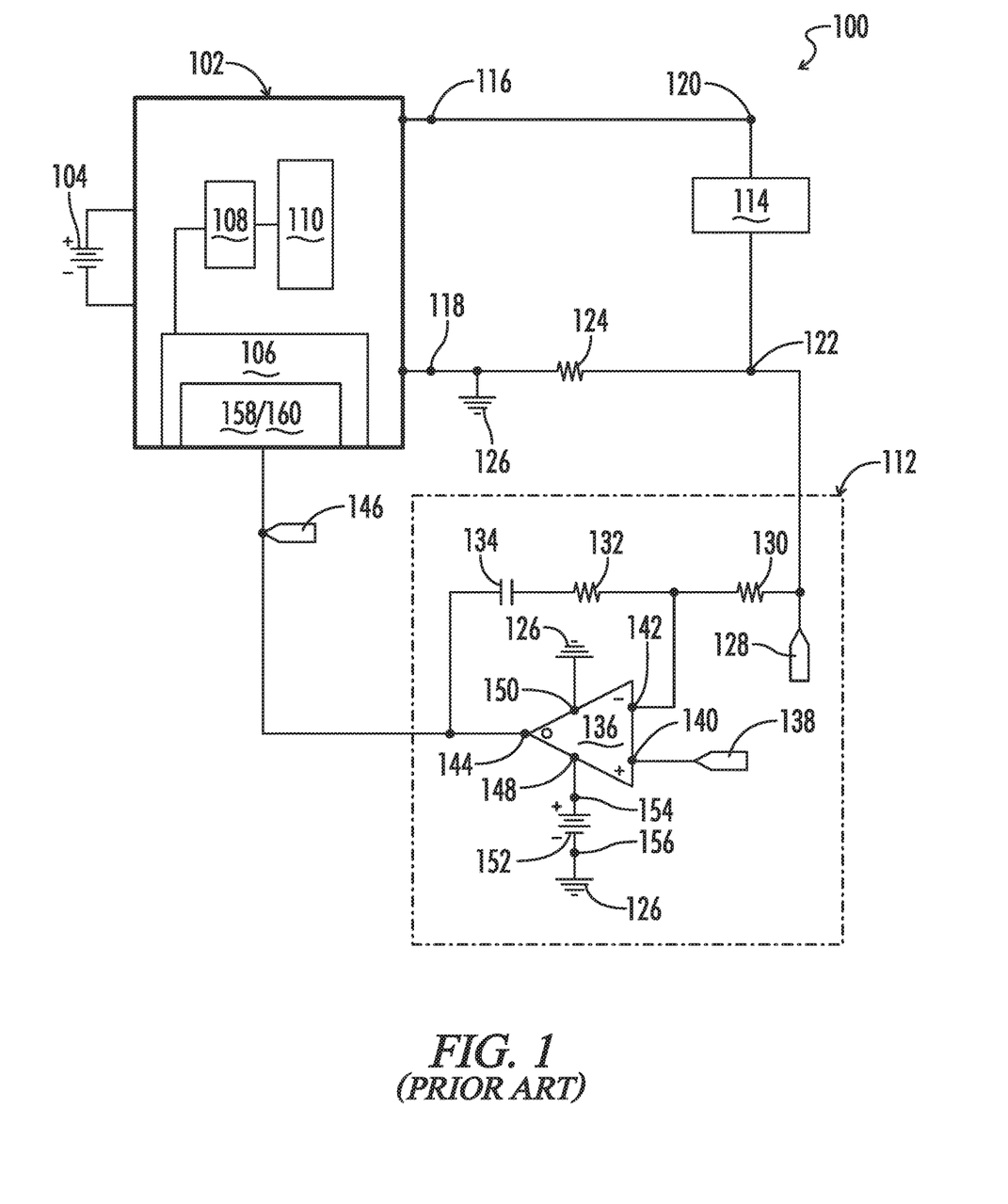
FIG. 1 is a circuit block diagram representing a typical current feedback control scheme for a constant current LED driver.

According to a typical current feedback control scheme as represented in FIG. 1, an exemplary constant current LED driver 100 includes a power converter 102 which receives power from a first voltage source 104. The first voltage source 104 may be a direct current (DC) voltage source, as an output from a DC energy storage device, a bridge rectifier, power factor correction (PFC) circuit, or the like. The power converter 102 includes at least a gate drive integrated circuit (IC) 106, a switch 108, and a power tank 110. The power tank 110 could either be a frequency controlled type converter (e.g., a half-bridge type) or a duty-ratio controlled type converter (e.g., buck-boost or flyback type). The power converter 102 includes an LED load 114 coupled between a first output terminal 116 and second output terminal 118 of the power converter 102, at respective load input 120 and output terminals 122.

The LED driver 100 further includes a current sensing resistor 124 which is configured to sense the current going through the LED load 114. The current sensing resistor 124 in the present example is coupled between the second output terminal 118 of the power converter 102 and the load output terminal 122. The second output terminal 118 of the power converter 102 may be coupled to earth ground 126. The sensed current going through the LED load 114 may be referred to as an output current 128 measured at the load output terminal 122.

In order to maintain a constant output current, the exemplary LED driver 100 includes a current proportional integral (PI) control loop 112 coupled between the load output terminal 122 and the power converter 102. The PI loop 112 includes an operational amplifier (OPAMP) 136 having an input current reference signal 138 coupled to a non-inverting input terminal 140 thereof. A first resistor 130 is coupled between the load output terminal 122 and an inverting input terminal 142 of the OPAMP 136, and a second resistor 132 is coupled in series with a capacitor 134 between the inverting input terminal 142 and an output terminal 144 of the OPAMP 136. The output terminal 144 of the OPAMP 136 is configured to output an error voltage signal 146 which is fed back to the power converter 102. The OPAMP 136 of the PI loop 112 further includes a positive voltage supply terminal 148 and a negative voltage supply terminal 150. The positive voltage supply terminal 148 is coupled to a second voltage source 152 at a first end 154 of the second voltage source 152. The second voltage source 152 includes a second end 156 coupled to earth ground 126. The negative voltage supply terminal 150 of the OPAMP 136 is coupled to earth ground 126.

The exemplary gate drive integrated circuit (IC) 106 of the power converter 102 has a voltage controlled oscillator (VCO) 158 or a comparator 160 coupled thereto. The VCO 158 or comparator 160 is configured to receive and transfer the error voltage signal 146 to either a frequency gate drive control input or duty-ratio gate drive control input, depending on the type of power tank 110 implemented. The frequency input or duty-ratio control input associated with the error voltage signal 146 is then sent to the gate drive IC 106 in order to control the switch 108.

When the input current reference signal 138 changes, the error voltage signal 146, the frequency control input or duty-ratio control input, and a frequency or a duty-ratio in power converter 102 will change accordingly in order to regulate the output current 128 to be the same as input current reference signal 138.

Otherwise stated, changes to the input current reference signal 138 will have an indirect but corresponding effect on the output current 128 passing through the LED load 114. However, one primary issue with this typical current feedback control scheme for a constant current LED driver 100 is that the PI loop 112 is slow. For example, the PI loop may typically have a crossover frequency less than 1 kHz, meaning that loop will ignore any disturbing signal with a frequency greater than 1 kHz. As a result of this limitation, it is impossible to modulate the output current 128 with a frequency greater than 1 kHz by changing the input current reference signal 138.

Figure 2:
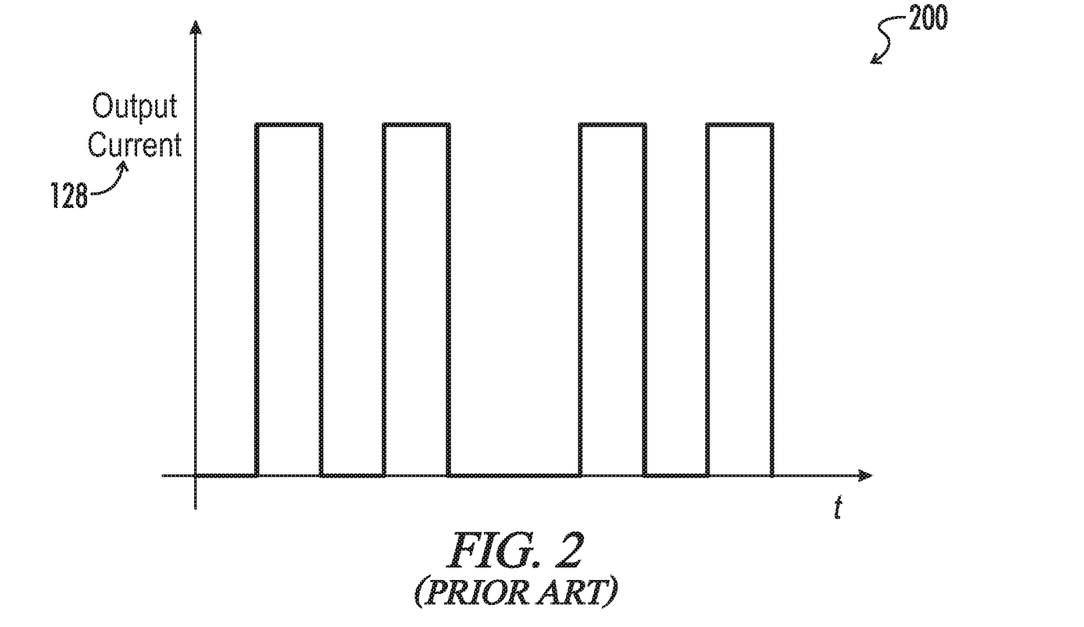
FIG. 2 is a graphical diagram representing an ideal LED output current modulating waveform associated with the LED driver of FIG. 1.

Referring next to an ideal LED output current modulating waveform 200 as illustrated in FIG. 2, an exemplary output current 128 is turned on and off according to the communication protocol. The rise time and fall time are each very sharp, which is ideal for a sensor to sense the modulation. There is also no overshoot at any time during the illustrated ideal current modulation.

Figure 3:
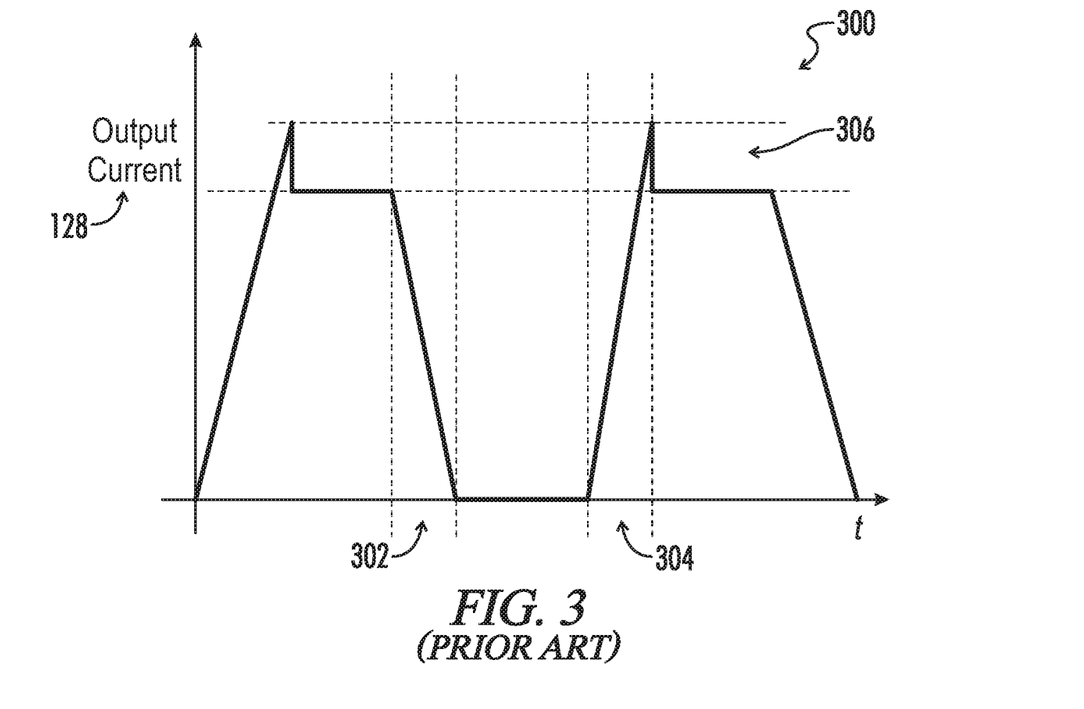
FIG. 3 is a graphical diagram representing a practical LED output current modulating waveform associated with the LED driver of FIG. 1.

However, as illustrated for example in FIG. 3, a more practical LED output current modulating waveform 300 will typically include a turn-off delay time 302, a turn-on delay time 304, and a turn-on overshoot current 306. An excessive turn-off delay time 302, turn-on delay time 304, and/or turn-on overshoot current 306 may negatively impact communication reliability and make the modulation practically useless. It is accordingly desirable to reduce the turn-off delay time 302, the turn-on delay time 304, and the turn-on overshoot current 306 as much as possible to ensure reliable communication based on LED output current modulation.

Figure 4:
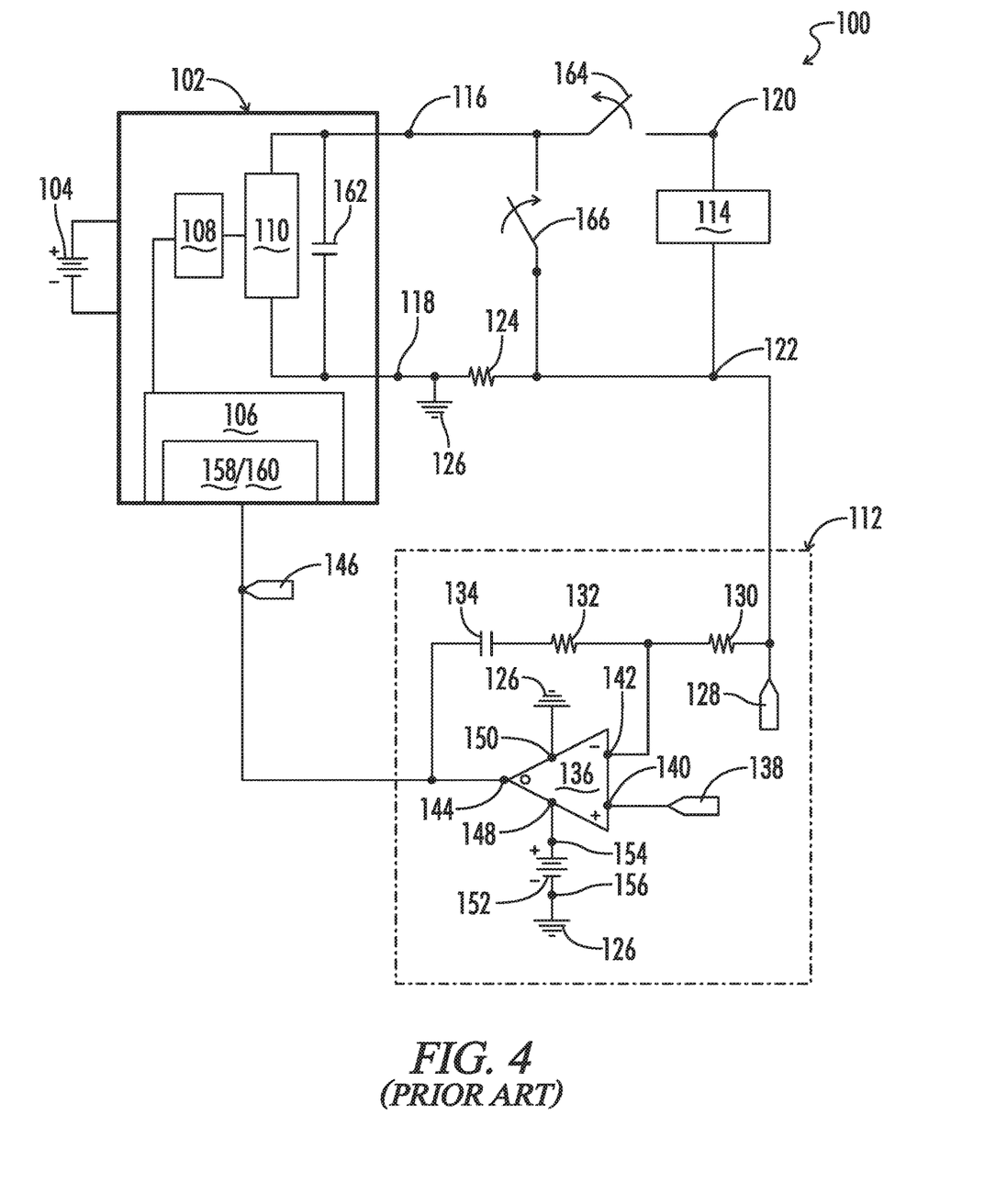
FIG. 4 is a circuit block diagram representing two intuitive approaches for achieving LED output current modulation, a short-circuit switch and an open-circuit switch, utilizing the LED driver of FIG. 1.

Referring next to FIG. 4, the LED load 114 may either be open- or short-circuited in order to achieve LED output current modulation. FIG. 4 depicts the current feedback control scheme for a constant current LED driver 100 as shown in FIG. 1 with the addition of an output capacitor 162, an open-circuit switch 164, and a short-circuit switch 166. The output capacitor 162 is coupled between the first output terminal 116 and the second output terminal 118 of the power converter 102. A first method of LED output current modulation is to couple the open-circuit switch 164 in series with the LED load 114. A second method of LED output current modulation is to couple the short-circuit switch 166 in parallel with the LED load 114. However, due to the PI loop 112 neither the first method nor the second method will work effectively, as further described herein.

In the case of the first method, when the open-circuit switch 164 is opened, the output current 128 through the LED load 114 will quickly fall to zero. The PI loop 112, however, will continually attempt to maintain a constant output current through the current sensing resistor 124 while the open-circuit switch 164 is open. As a result, all of the extra energy will be stored in the output capacitor 162, which causes a substantial voltage increase in the output capacitor 162. This voltage increase will in turn create a substantial turn-on current spike when the open-circuit switch 164 is closed.

In the case of the second method, when the short-circuit switch 166 is closed, the output current 128 through the LED load 114 will rapidly fall to zero. This is unfortunate and wasteful in that all of the energy stored in the output capacitor 162 will be rapidly discharged through the short-circuit switch 166. Due to the fact that the operation condition for the LED driver 100 changed from full load to zero load, it will take some time for the PI loop 112 to adjust and restart the LED load 114. Thus, implementation of the second method will result in a long turn-on delay.

One of skill in the art may appreciate that neither of these methods provide a good solution for overcoming the problems associated with LED output current modulation using a constant current LED driver 100.

BRIEF SUMMARY

Accordingly, it is desirable for various embodiments of a lighting device and method as disclosed herein to reduce turn-on delay time, turn-off delay time, current overshoot, and power loss during LED output current modulation.

Various embodiments of a lighting device and method as disclosed herein may further include an energy recovery stage which desirably enables energy recycling.

Various embodiments of a lighting device and method as disclosed herein may further programmatically "remember" and apply previous control information on the next device startup, or at the end of a modulation string, to desirably ensure quick startup without overshooting.

In a particular embodiment, an LED lighting device as disclosed herein is configured for providing light modulation control. A first voltage source is configured to provide an input current to a power converter circuit. The power converter circuit is configured to provide a constant current output to a load coupled across first and second output terminals of the power converter circuit. The load has first and second ends. A feedback circuit is coupled between the second end of the load and a gate drive integrated circuit (IC) of the power converter circuit. The feedback circuit is configured to produce an error voltage signal which is fed back to the power converter circuit. A buffer circuit is coupled across the first and second ends of the load and configured to temporarily store energy for reuse when enabled. A controller is coupled between the feedback circuit and the power converter circuit. The controller is configured to: receive a modulation control input which initiates a modulation-on stage (the absence of the modulation control input is associated with a modulation-off stage), store the error voltage signal prior to the modulation control input, enable the buffer circuit in response to the modulation-on stage and disable the buffer circuit in response to the modulation-off stage, and disable the power converter circuit in response to the modulation-on stage and enable the power converter circuit in response to the modulation-off stage. An energy recovery circuit is coupled to both the feedback circuit and the controller. The energy recovery circuit has a second voltage source and is configured to selectively apply power to the feedback circuit and the controller from either the buffer circuit or the second voltage source.

In an embodiment, the power converter circuit includes a voltage controlled oscillator coupled to the gate drive IC. The controller is configured to convert the error voltage signal into a frequency control input which is configured to be sent to the voltage controlled oscillator.

In another embodiment, the power converter circuit includes a comparator coupled to the gate drive integrated circuit. The controller is configured to convert the error voltage signal into a duty-ratio control input which is configured to be sent to the comparator.

In another embodiment, the error voltage signal produced by the feedback circuit is based on a sensed output current through the load relative to a reference input current.

In another embodiment, the LED lighting device further includes an output capacitor coupled across the first and second output terminals of the power converter circuit which is configured to store energy from the power converter circuit.

In another embodiment, the buffer circuit includes a buffer capacitor coupled to at least one switch which is controlled by the controller. The buffer capacitor is configured to operate as a short-circuit on the load and output capacitor in response to the modulation-on stage. The buffer capacitor is further configured to store energy from the output capacitor in response to the modulation-on stage.

In another embodiment, the buffer capacitor is at least five times the capacitance as the output capacitor which thereby enables the buffer capacitor to function as a short-circuit on the output capacitor and the load.

In another embodiment, the energy recovery circuit is configured to apply energy from either the buffer capacitor or the second voltage source to at least the feedback circuit and the controller. The energy from the buffer capacitor is utilized until depleted to a predetermined threshold voltage, at which time the second voltage source kicks in to provide power to at least the feedback circuit and the controller. The predetermined threshold voltage is substantially equal to a voltage of the second voltage source.

In another embodiment, the power converter circuit is disabled in response to the modulation-on stage in order to avoid transferring additional energy into the output capacitor or the buffer capacitor.

In another embodiment, the controller is configured to convert the stored error signal recorded prior to the modulation control input into at least one of a frequency control input and a duty-ratio control input. The controller is further configured to enable the power converter circuit with at least one of a frequency and a duty-ratio less than or equal to the frequency control input or the duty-ratio control input stored prior to the modulation-on stage.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. Where the various figures may describe embodiments sharing various common elements and features with other embodiments, similar elements and features are given the same or similar reference numerals and redundant description thereof may be omitted below.

Figure 5:
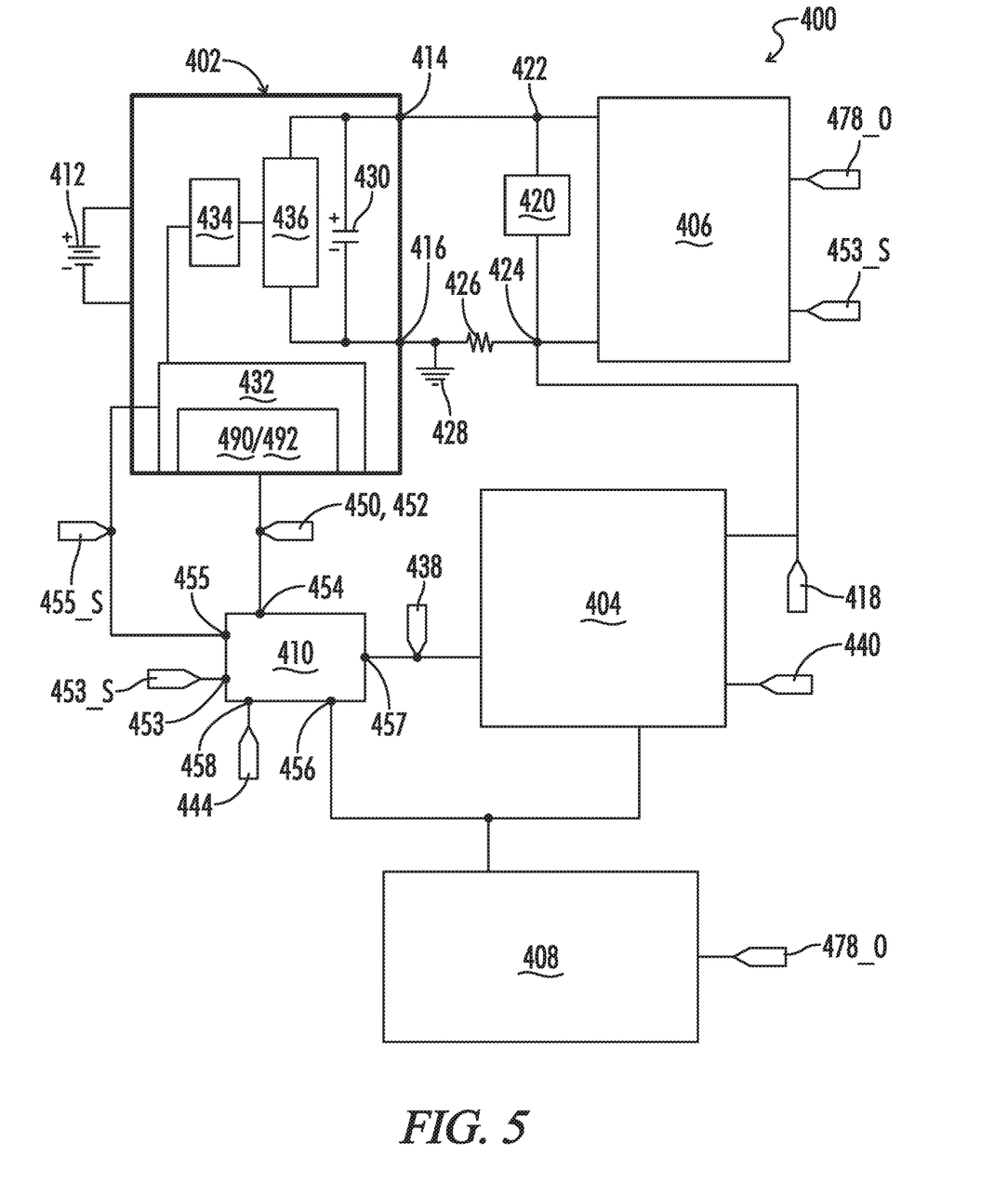
FIG. 5 is a circuit block diagram representing an exemplary LED driver circuit for lossless fast light modulating control in accordance with aspects of the present disclosure.
Figure 6:
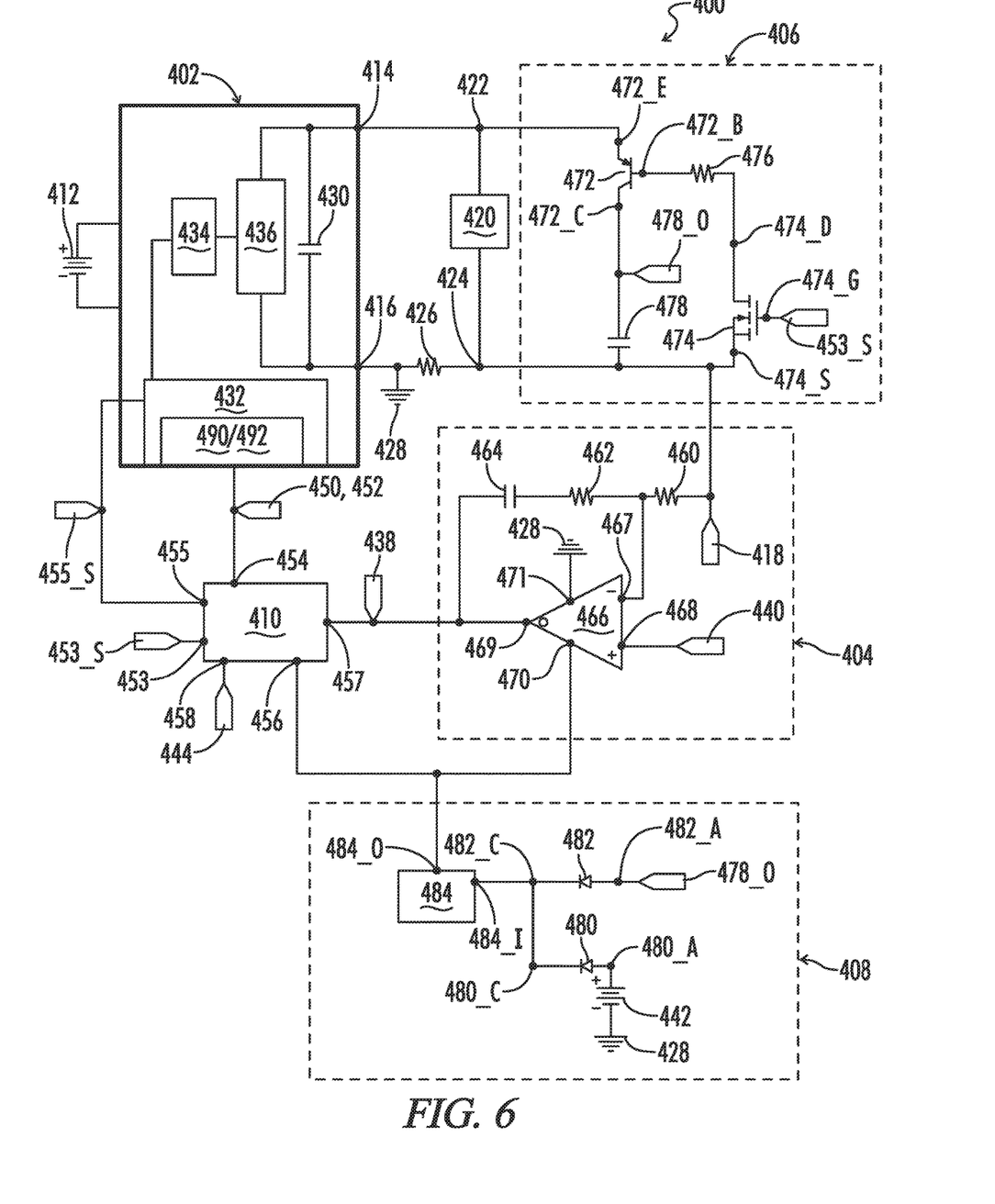
FIG. 6 is a circuit block diagram representing the LED driver circuit of FIG. 5 with detailed circuit elements.

FIGS. 5 and 6 illustrate exemplary embodiments of a light emitting diode (LED) driver 400 for providing fast and lossless light modulation control. The LED driver 400 may be referred to as embodying or otherwise embodied by an LED lighting device 400. The LED driver 400 includes a power converter circuit 402, a feedback circuit 404, a buffer circuit 406, an energy recovery circuit 408, and a controller 410. The term "circuit" as used herein may mean at least either a single component or a multiplicity of components, either active and/or passive, that are coupled together to provide a desired function. The term "controller" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The power converter circuit 402 is coupled to a first voltage source 412. The first voltage source 412 is a direct-current (DC) voltage source, as an output from a DC energy storage device, a bridge rectifier, power factor correction (PFC) circuit, or the like. The power converter circuit 402 includes a first output terminal 414 and a second output terminal 416. The power converter circuit 402 is configured to provide an output current 418 to an LED load 420. The LED load 420 includes a first end 422 and a second end 424. The first end 422 of the LED load 420 is coupled to the first output terminal 414. The LED load 420 is coupled in series with a current sensing resistor 426 between the first output terminal 414 and the second output terminal 416, which is configured to sense the output current 418 passing through the LED load 420. The second output terminal 416 of the power converter circuit 402 is coupled to earth ground 428. The power converter may further include an output capacitor 430 coupled between the first and second output terminals 414, 416 and accordingly configured to store energy from the power converter circuit 402. It should be noted that whereas the current sensing resistor 426 is illustrated as being coupled between a second output terminal 416 of the power converter and a second end of the load 420, the current sensing resistor 426 or equivalent current sensor 426 could be defined within or otherwise in association with the power converter, such that the first and second ends 422, 424 of the load may comprise first and second output terminals of the power converter.

The power converter circuit 402 may include a gate drive integrated circuit (IC) 432, one or more switches in a switching circuit 434, and a power tank 436. The switching circuit 434 is coupled between the gate drive IC 432 and the power tank 436. The gate drive IC 432 is configure to control an operational state of the switching circuit 434. The power tank 436 may either be frequency controlled (i.e. a half-bridge type) or duty-ratio controlled (i.e., a buck, boost, or flyback type).

The feedback circuit 404 is configured to generate an error voltage signal 438 which is based at least in part on the output current 418 through the LED load 420 relative to a reference input current 440. The reference input current 440 may for example be provided from an external dimming control device, a local user interface, one or more sensors, a lighting management system, or the like. The error voltage signal 438 may be referred to as an error signal 438. The feedback circuit 404 is coupled between the second end 424 of the LED load 420 and the controller 410. The error voltage signal is configured to be fed back to the controller 410.

The buffer circuit 406 is configured for quick turn off of the LED load 420 and for temporary storage of power from the output capacitor 430. The buffer circuit 406 is coupled in parallel with the LED load 420 between the first and second ends 422, 424.

The energy recovery circuit 408 includes a second voltage source 442 as shown in FIG. 6. The energy recovery circuit 408 is configured for powering at least the feedback circuit 404 and the controller 410 from a selected one of the buffer circuit 406 and the second voltage source 442. The second voltage source 442 may be a direct-current (DC) voltage source (e.g., Vcc).

The controller 410 is coupled between the feedback circuit 404 and the power converter circuit 402. The controller 410 is configured to receive a modulation control input 444. The modulation control input 444 may be from an external source or protocol, for example as initiated remotely as part of a device or system commissioning process, or may alternatively be generated based on a timer where for example the device communications are provided periodically. The controller 410 is further configured to store the error voltage signal 438 associated with a particular operating condition, especially just prior to the modulation control input 444. The modulation control input 444 is associated with a modulation-on stage 446, whereas the absence thereof is associated with a modulation-off stage 448. The controller 410 is further configured to enable the buffer circuit 406 in response to the modulation-on stage 446 and disable the buffer circuit 408 in response to the modulation-off stage 448. The controller 410 is further configured to disable the gate drive IC 432 in response to the modulation-on stage 446 and enable the gate drive IC 432 in response to the modulation-off stage 448. The controller 410 may also be configured convert the error voltage signal 438 into at least one of a frequency control input 450 and a duty-ratio control input 452. The power converter circuit 402 is responsive to either the frequency control input 450 or the duty-ratio control input 452 depending on the type of power tank 436 used.

As shown in FIG. 6, the controller 410 includes a buffer control output terminal 453, a frequency and duty-ratio control output terminal 454, a gate control output terminal 455, a power input terminal 456, an error signal input terminal 457, and a modulating control input terminal 458. The buffer control output terminal 453 may be coupled to the buffer circuit 406. The controller may be configured to produce a buffer control signal 453_S for controlling a state of the buffer circuit 406. The frequency and duty-ratio control output terminal 454 may be coupled to the power converter circuit 402. The gate control output terminal 455 may be coupled to the gate drive IC 432. The controller 410 may be configured to produce a gate drive control signal 455_S for controlling a state of the gate drive IC 432. The power input terminal 456 may be coupled to the energy recovery circuit 408. The error signal input terminal 457 may be coupled to the feedback circuit 404, and the modulating control input terminal 458 is coupled to the modulation control input 444. The controller 410 disables the power converter circuit 402 in response to the modulating-on stage 446 by controlling the gate drive IC 432 in order to stop energy conversion immediately after the modulation control input 444. As a result, no extra energy from the power converter circuit 402 will be transferred into the output capacitor 430 or the buffer circuit 406 during the modulation-on stage 446.

As shown in FIG. 6, the feedback circuit 404 includes a first feedback resistor 460, a second feedback resistor 462, a feedback capacitor 464, and an operational amplifier (OPAMP) 466. The OPAMP 466 includes an inverting input terminal 467, a non-inverting input terminal 468, an output terminal 469, a positive supply voltage terminal 470, and a negative supply voltage terminal 471. The first feedback resistor 460 is coupled between the second end 424 of the LED load 420 and the inverting input terminal 467 of the OPAMP 466. The second feedback resistor 462 is coupled in series with the feedback capacitor 464 between the inverting input terminal 467 and the output terminal 469 of the OPAMP 466. The output terminal 469 is coupled to the error signal input terminal 457 of the controller 410. The non-inverting input terminal 468 is coupled to the reference input current 440. The positive supply voltage terminal 470 is coupled to the energy recovery circuit 408 and the negative supply voltage terminal 471 is coupled to earth ground 428.

As shown in FIG. 6, the buffer circuit 406 includes a first buffer switch 472, a second buffer switch 474, a buffer resistor 476, and a buffer capacitor 478. The first buffer switch 472 includes an emitter node 472_E, a base node 472_B, and a collector node 472_C. The second buffer switch 474 includes a drain node 474_D, a gate node 474_G, and a source node 474_S. The emitter node 472_E of the first buffer switch 472 is coupled to the first end 422 of the LED load 420. The buffer resistor 476 is coupled between the base node 472_B of the first buffer switch 472 and the drain node 474_D of the second buffer switch 474. The buffer capacitor 478 is couple between the collector node 472_C of the first buffer switch 472 and the second end 424 of the LED load 420. The buffer capacitor 478 includes a buffer capacitor output terminal 478_O coupled to the power recovery circuit 408. The gate node 474_G of the second buffer switch 474 is coupled to the buffer control output terminal 453 of the controller 410. The source node 474_S of the second buffer switch 474 is coupled to the second end 424 of the LED load 420.

The buffer circuit 406 is controlled by the controller 410. More specifically, the second buffer switch 474 is controlled by the controller 410. When the controller 410 receives a modulation control input 444 (i.e., the modulation-on stage 446), it will set the buffer control output terminal to high and thereby turn on the second buffer switch 474. When the second buffer switch 474 is on, a base current of the first buffer switch 472 will be turned on through the buffer resistor 476 and as a result the first buffer switch 472 will be turned on. Energy stored in the output capacitor 430 will be discharged into the buffer capacitor 478 very quickly for storage. The buffer capacitor 478 has a capacitance designed to be large enough, for example, five to ten times larger than the capacitance of the output capacitor 430, though not limited to this range, in order for the initial turn on of the buffer stage to operate as a short-circuit on the output capacitor 430 and the LED load 420. As a result, the LED load 420 will be turned off fast and energy in the output capacitor 430 will be transferred to the buffer capacitor 478, and a new voltage balance will be established according to the following equation:

$$V_{new} = \frac{C_{out} \times V_{old}}{C_{out} + C_{buffer}}$$

where $V_{new}$ is the voltage after the buffer circuit is on, $V_{old}$ is the voltage before the buffer circuit is on, $C_{out}$ is the capacitance of the output capacitor 430, and $C_{buffer}$ is the capacitance of the buffer capacitor 478. As can be seen, $V_{now}$ is always smaller than $V_{old}$. For example, if the buffer capacitor 478 has a capacitance five times larger than the capacitance of the output capacitor 430, then $$V_{new} = \frac{1}{6} \times V_{old}.$$

As shown in FIG. 6, the energy recovery circuit 408 includes the second voltage source 442, a first diode 480, a second diode 482, and a voltage regulator 484. The first diode 480 includes an anode 480_A and a cathode 480_C. The second diode 482 includes an anode 482_A and a cathode 482_C. The voltage regulator 484 includes at least one voltage regulator input 484_I and at least one voltage regulator output 484_O. The second voltage source 442 is coupled between the anode 480_A of the first diode 480 and earth ground 428. The anode 482_A of the second diode 482 is coupled to the buffer capacitor 478 at the buffer capacitor output terminal 478_O. Both cathodes 480_C, 482_C are coupled to the at least one voltage regulator input 484_I of the voltage regulator 484. The at least one voltage regulator output 484_O of the voltage regulator 484 is coupled to at least the positive supply voltage terminal 471 of the OPAMP 466 and the power input terminal 456 of the controller 410. The voltage regulator 484 may supply power to any other control circuits which may be implemented.

As a result of this configuration, all power stored in the buffer capacitor 478 is redirected to the energy recovery circuit 408 to be recycled in response to the modulation-off stage 448. The energy recovery circuit 408 selectively applies energy from either the buffer capacitor 478 of the buffer circuit 406 or the second voltage source 442 of the energy recovery circuit 408. The energy is applied to at least the OPAMP 466 of the feedback circuit 404 and the power input terminal 456 of the controller 410. Energy from the buffer capacitor 478 is utilized until a voltage of the buffer capacitor 478 is discharged to a predetermined threshold voltage. The predetermined threshold voltage is equal to a voltage of the second voltage source 442. Energy from the second voltage source 442 is utilized once the voltage of the buffer capacitor 478 falls below the predetermined threshold voltage (i.e., the voltage of the second voltage source). As a result, power stored in the buffer capacitor 478 is recycled during the modulation-off stage 448.

Figure 7:
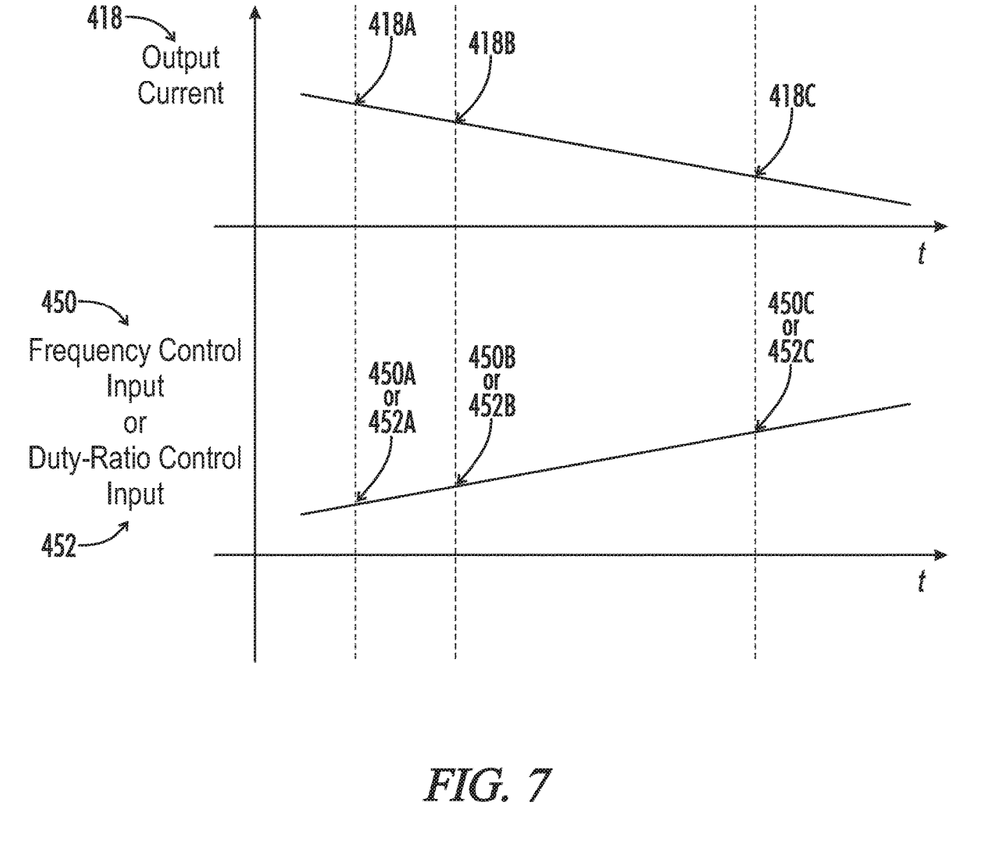
FIG. 7 is a graphical diagram representing the time-varying output current and frequency/duty-ratio provided by the LED driver circuit of FIGS. 5 and 6.

In an exemplary embodiment, the controller 410 may be configured to buffer the error voltage signal 438 from the feedback circuit 404. The controller 410 may be configured to remember and store the error voltage signal 438 at any time, especially just prior to the modulation control input 444 and associated modulation-on stage 446. As shown in FIG. 7, each output current 418 of the LED load 420 is associated with a different frequency control input 450 and/or duty-ratio control input 452. FIG. 7 includes a first output current 418A associated with first frequency and duty-ratio control inputs 450A, 452A, a second output current 418B associated with second frequency and duty-ratio control inputs 450B, 452B, and a third output current 418C associated with third frequency and duty-ratio control inputs 450C, 452C. The controller 410 may further be configured to store these associations, thereby allowing the controller 410 to easily convert the error voltage signal into either the frequency control input 450 or the duty-ratio control input 452. The controller 410 is configured to restart the power converter circuit 402 (i.e., the gate drive IC 432) at the end of the modulation-on stage with either the frequency control input 450 or the duty-ratio control input 452 equal to or slightly less the value stored just prior to the modulation on-stage. As a result, when the modulation-off stage 448 starts, the output current 418 through the LED load 420 will immediately start from the same output current 418 prior to the modulation-on stage 446. This configuration minimizes turn-on time and overshoot, two issues previously discussed above.

In other exemplary embodiments, the power converter circuit 402 may include a voltage controlled oscillator (VCO) 490 or a comparator 492 to convert the error voltage signal 428 and control the frequency control input 450 or the duty-ratio control input 452, respectively. The VCO 490 may be implemented when the power tank 436 is a frequency controlled type, as described above. The comparator 492 may be implemented when the power tank 436 is a duty-ratio controlled type, as described above.

Figure 8:
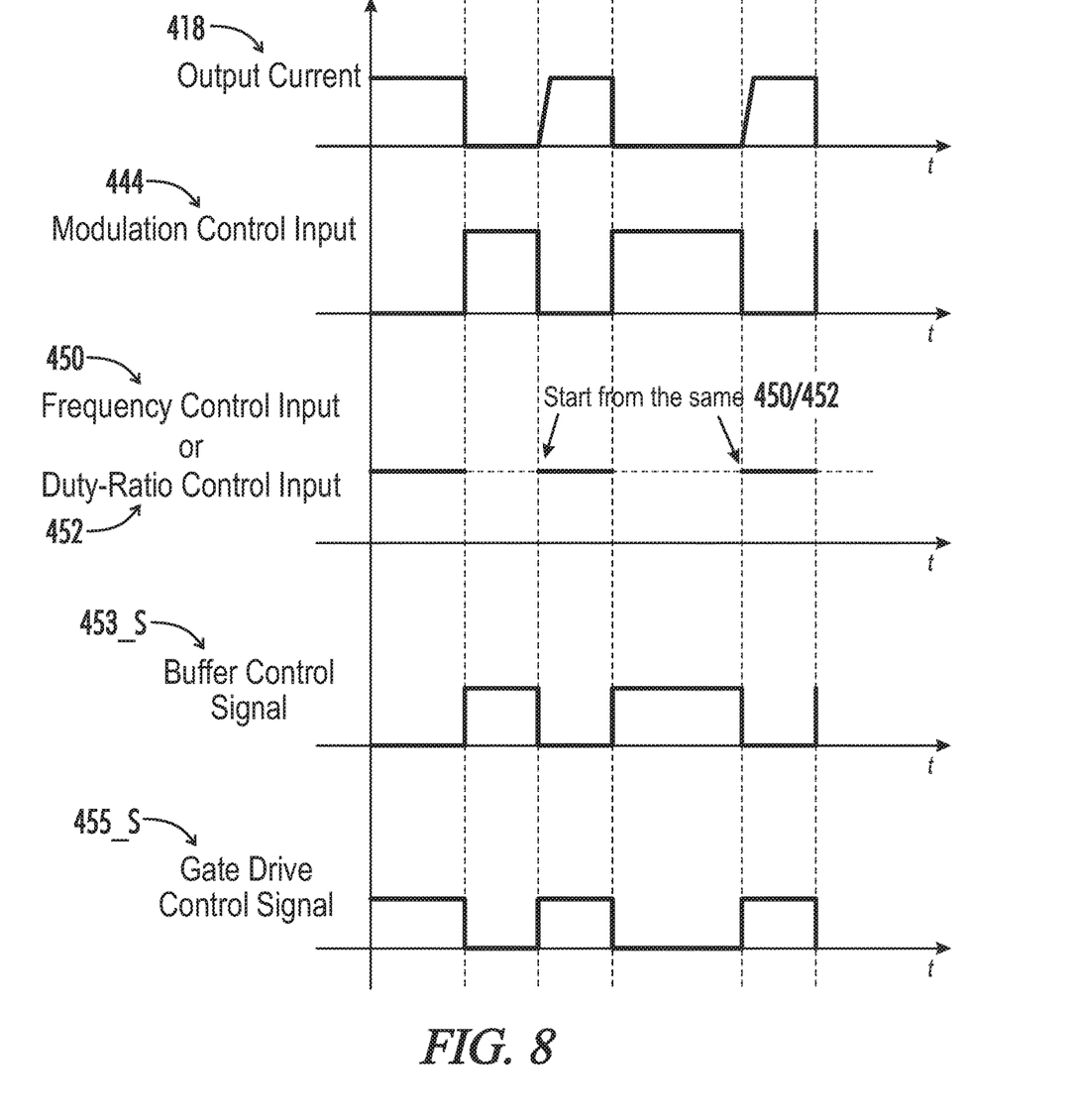
FIG. 8 is a graphical diagram representing a time-varying output current, modulation control input, frequency/duty-ratio, buffer state, and gate drive state for a modulating control sequence provided by the LED driver circuit of FIGS. 5 and 6.

Referring to FIG. 8, a waveform is provided summarizing an exemplary sequence of the modulation control input 444 in accordance with embodiments as disclosed herein. The chart varies with time and simultaneously displays: (1) the output current 418 of the LED load, (2) the modulation control input 444, (3) the frequency and/or duty-ratio control inputs 450, 452, (4) the state of the buffer circuit 406, and (5) the state of the gate drive IC 432.

Figure 9:
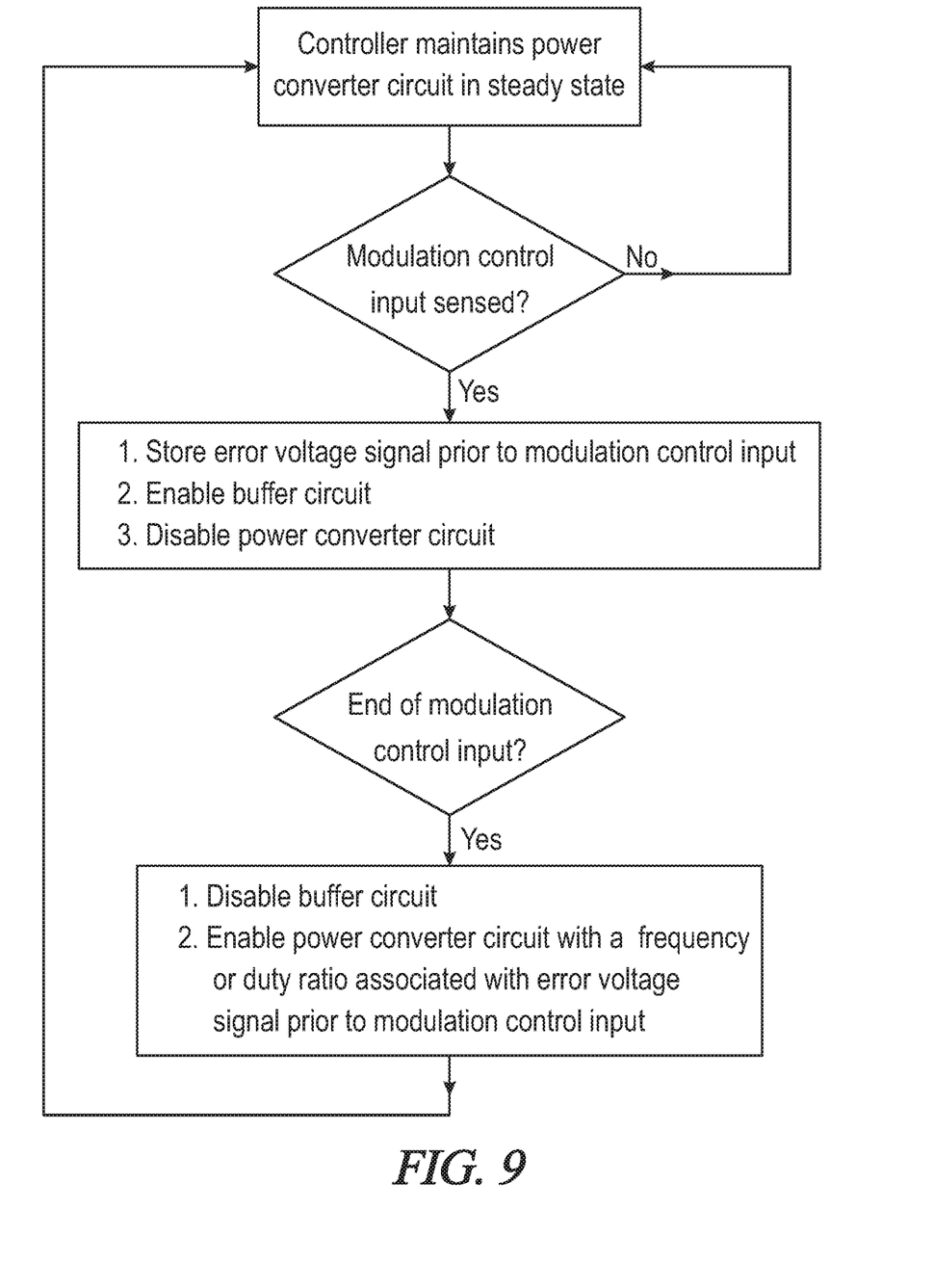
FIG. 9 is a flowchart representing an exemplary control process for a controller of the LED driver of FIGS. 5 and 6.

Referring to FIG. 9, an exemplary control flowchart for the controller 410 is shown in accordance with embodiments as disclosed herein. The flowchart depicts a method of controlling light modulation of a constant current LED driver. The method includes the step of the controller 410 sensing a modulation control input 444. In response to the modulation control signal 444, the controller 410 will begin to function responsive to the modulation-on stage 446 by storing the error voltage signal 438 prior to the sensed modulation control input 444. The controller 410 is further configured to be responsive to the modulation-on stage 446 by converting the error voltage signal 438 prior to the sensed modulation control input 444 into at least one of the frequency control input 450 and the duty-ratio control input 452. The controller 410 is further configured to be responsive to the modulation-on stage 446 by enabling the buffer circuit 406 and associated buffer capacitor 478 to thereby short-circuit the LED load 420 and quickly absorb energy from the output capacitor 430. The controller 410 is further configured to be responsive to the modulation-on stage 446 by disabling the power converter circuit 402 in order to halt any further transfer of energy from the power converter circuit 402 to the output capacitor 430 and the buffer capacitor 478.

The method further includes the step of the controller 410 sensing a modulation-off stage 448 following a modulation-on stage 446. Once the modulation control input 444 is complete and the modulation-on stage 446 is over, the controller 410 is configured to disable the buffer circuit 406 and enable the power converter circuit 402 with at least one of the frequency control input 450 and the duty-ratio control input 452 set to a prior value converted from the error voltage signal 438 just prior to the sensing modulation control input 444.

In certain embodiments, the method may include the steps of: directing energy from the buffer capacitor 478 into the energy recovery circuit 408, supplying energy from the buffer capacitor 478 to at least the controller 410 and the feedback circuit 404 until the buffer capacitor is discharged to a predetermined threshold voltage, and supplying energy from the second voltage source 442 once the buffer capacitor has been discharged to the predetermined threshold voltage.

In the absence of the modulation control input 444, the controller 410 is configured to maintain the power converter circuit 402 in a steady state. When the reference input current changes, the error voltage signal will also change. The controller will convert the error voltage signal into either a frequency control input 450 or a duty-ratio control input 452 which will be fed into the power converter in order to regulate the output current 418 to be the same as the reference input current.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An LED lighting device for light modulation control comprising:
    a power converter circuit configured to provide a constant current output to a load coupled across first and second output terminals of the power converter circuit;
    a feedback circuit coupled to the load and configured to produce an error voltage signal which is fed back to the power converter circuit;
    a buffer circuit coupled across the load and configured to selectively store energy for reuse;
    a controller coupled between the feedback circuit and the power converter circuit, the controller configured to:
        receive a modulation control input initiating a modulation-on stage, wherein absence of the modulation control input is associated with a modulation-off stage;
        store a value for the error voltage signal prior to the modulating control input;
        enable the buffer circuit in response to the modulation-on stage and disable the buffer circuit in response to a modulation-off stage; and
        disable the power converter circuit in response to the modulation-on stage and enable the power converter circuit in response to the modulation-off stage.

2. The LED lighting device of claim 1, further comprising an energy recovery circuit coupled to both the feedback circuit and the controller, the energy recovery circuit having a second voltage source, the energy recovery circuit configured to selectively supply power to the feedback circuit and the controller from either the buffer circuit or the second voltage source.

3. The LED lighting device of claim 1, wherein:
    the power converter circuit includes a voltage controlled oscillator coupled to a gate drive circuit: and
    the controller is configured to convert the error voltage signal into a frequency control input which is configured to be sent to the voltage controlled oscillator.

4. The LED lighting device of claim 1, wherein:
    the power converter circuit includes a comparator coupled to the gate drive circuit; and
    the controller is configured to convert the error voltage signal into a duty-ratio control input which is configured to be sent to the comparator.

5. The LED lighting device of claim 1, wherein the error voltage signal produced by the feedback circuit is based on a sensed output current through the load relative to a reference input current.

6. The LED lighting device of claim 1, further comprising an output capacitor coupled across the first and second output terminals of the power converter circuit, the output capacitor configured to store energy from the power converter circuit.

7. The LED lighting device of claim 6, wherein
    the buffer circuit includes a buffer capacitor coupled to at least one buffer switch, the at least one buffer switch controlled by the controller;
    the buffer circuit operates as a short-circuit on the load and output capacitor in response to the modulation-on stage; and
    the buffer capacitor stores energy discharged from the output capacitor in response to the modulation-on stage.

8. The LED lighting device of claim 7, wherein the buffer capacitor is at least five times the capacitance as the output capacitor.

9. The LED lighting device of claim 7, further comprising an energy recovery circuit coupled to both the feedback circuit and the controller, the energy recovery circuit having a second voltage source, the energy recovery circuit configured to selectively supply power to the feedback circuit and the controller from either the buffer circuit or the second voltage source.

10. The LED lighting device of claim 9, wherein:
    the energy recovery circuit is configured to selectively apply energy from either the buffer capacitor or the second voltage source to at least the feedback circuit and the controller;
    energy from the buffer capacitor is utilized until depleted to a predetermined threshold voltage; and
    energy from the second voltage source is utilized once the predetermined threshold voltage is reached by the buffer capacitor.

11. The LED lighting device of claim 10, wherein the predetermined threshold voltage is substantially equal to a voltage of the second voltage source.

12. The LED lighting device of claim 1, wherein the power converter circuit is disabled in response to the modulation-on stage in order to avoid transferring additional energy into an output capacitor or a buffer capacitor.

13. The LED lighting device of claim 1, wherein:
    the controller is configured to convert the stored error signal recorded prior to the modulation control input into at least one of a frequency control input and a duty-ratio control input; and
    the controller is configured to enable the power converter circuit with at least one of a frequency and a duty-ratio less than or equal to the frequency control input or the duty-ratio control input stored prior to the modulation-on stage.

14. A method of controlling light modulation of a constant current LED driver comprising a power converter and an output capacitor coupled across output terminals thereof, said output terminals further configured to receive an LED load, the method comprising the steps of:
    in a modulation-on stage corresponding to a sensed modulation control input:
        storing a value for an error voltage signal received prior to the sensed modulation-on stage;
        converting the error voltage signal prior to the sensed modulation-on stage into at least one of a frequency control input and a duty-ratio control input prior to the sensed modulation-on stage;
        enabling a buffer circuit to short-circuit the load and absorb energy from the output capacitor; and disabling the power converter circuit to halt further transfer of energy from the power converter circuit to the output capacitor and the buffer capacitor; and in a modulation-off stage corresponding to an absence of the modulating control input:
  disabling the buffer circuit; and
  enabling the power converter circuit with at least one of a frequency and a duty-ratio set to the frequency control input or the duty-ratio control input converted from the error voltage signal prior to the sensed modulation-on stage.

15. The method of claim 14, where the method further comprises the steps of:
  directing energy stored in the buffer circuit into an energy recovery circuit, the energy recovery circuit having an auxiliary energy source;
  supplying energy to at least the controller from the buffer circuit until discharged to predetermined threshold voltage; and
  supplying energy to at least the controller from the auxiliary energy source once the buffer circuit is discharged below the predetermined threshold voltage.

16. The method of claim 14, further comprising the step of maintaining a steady state operation in response to the modulation-off stage.

17. The method of claim 14, wherein the error voltage signal is produced based on a sensed output current through the load relative to a reference input current.

* * * * *